(12) United States Patent
Zhou et al.

(10) Patent No.: US 11,797,084 B2
(45) Date of Patent: Oct. 24, 2023

(54) METHOD AND APPARATUS FOR TRAINING GAZE TRACKING MODEL, AND METHOD AND APPARATUS FOR GAZE TRACKING

(71) Applicant: Tencent Technology (Shenzhen) Company Limited, Shenzhen (CN)

(72) Inventors: Zheng Zhou, Shenzhen (CN); Xing Ji, Shenzhen (CN); Yitong Wang, Shenzhen (CN); Xiaolong Zhu, Shenzhen (CN); Min Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 158 days.

(21) Appl. No.: 17/323,827

(22) Filed: May 18, 2021

(65) Prior Publication Data
US 2021/0271321 A1 Sep. 2, 2021

Related U.S. Application Data

(63) Continuation of application No. PCT/CN2020/083486, filed on Apr. 7, 2020.

(30) Foreign Application Priority Data

Apr. 24, 2019 (CN) .......................... 201910338224.6

(51) Int. Cl.
*G06F 3/01* (2006.01)
*G06K 9/62* (2022.01)
(Continued)

(52) U.S. Cl.
CPC ............ *G06F 3/013* (2013.01); *G06F 18/214* (2023.01); *G06T 5/002* (2013.01); *G06T 5/009* (2013.01);
(Continued)

(58) Field of Classification Search
CPC .... G06F 3/013; G06K 9/6256; G06K 9/6268; G06T 5/002; G06T 5/009; G06V 10/10;
(Continued)

(56) References Cited

U.S. PATENT DOCUMENTS 9,852,337 B1    12/2017 van Rotterdam et al.
2014/0240675 A1* 8/2014 Narasimha-Iyer ..... A61B 3/032
                                                                351/210
(Continued)

FOREIGN PATENT DOCUMENTS

CN    107103293 A    8/2017
CN    108229284 A    6/2018
(Continued)

OTHER PUBLICATIONS

Eunji Chong et al., "Connecting Gaze, Scene, and Attention: Generalized Attention Estimation via Joint Modeling of Gaze and Scene Saliency", School of Interactive Computing, Georgia Institute of Technology, Atlanta, GA, Computer Vision-ECCV 2018 15th European Conference, Munich, Germny, Sep. 8-14, 2018, 16 pgs.
(Continued)

*Primary Examiner* — Michael J Vanchy, Jr.
(74) *Attorney, Agent, or Firm* — Morgan, Lewis & Bockius LLP

(57) ABSTRACT

This application discloses a method for training a gaze tracking model, including: obtaining a training sample set; processing the eye sample images in the training sample set by using an initial gaze tracking model to obtain a predicted gaze vector of each eye sample image; determining a model loss according to a cosine distance between the predicted gaze vector and the labeled gaze vector for each eye sample image; and iteratively adjusting one or more reference parameters of the initial gaze tracking model until the model loss meets a convergence condition, to obtain a target gaze
(Continued)

tracking model. According to the solution provided in this application, a gaze tracking procedure is simplified, a difference between a predicted value and a labeled value can be better represented by using the cosine distance as a model loss to train a model, to improve prediction accuracy of the gaze tracking model.

20 Claims, 8 Drawing Sheets

(51) Int. Cl.
| | |
|---|---|
| *G06T 5/00* | (2006.01) |
| *G06V 10/82* | (2022.01) |
| *G06V 40/00* | (2022.01) |
| *G06V 40/18* | (2022.01) |
| *G06F 18/214* | (2023.01) |
| *G06V 40/19* | (2022.01) |
| *G06F 18/241* | (2023.01) |

(52) U.S. Cl.
CPC .............. *G06V 10/82* (2022.01); *G06V 40/00* (2022.01); *G06V 40/18* (2022.01); *G06F 18/241* (2023.01); *G06V 40/19* (2022.01); *G06V 40/193* (2022.01); *G06V 40/197* (2022.01)

(58) Field of Classification Search
CPC ........ G06V 10/40; G06V 10/82; G06V 10/88; G06V 40/00; G06V 40/18; G06V 40/19; G06V 40/193; G06V 40/197
See application file for complete search history.

(56) References Cited

U.S. PATENT DOCUMENTS

| | | | |
|---|---|---|---|
| 2018/0181737 A1 | 6/2018 | Tussy | |
| 2019/0303724 A1* | 10/2019 | Linden | ................. G06F 18/217 |
| 2019/0354174 A1* | 11/2019 | Young | ..................... G06F 3/015 |
| 2020/0202128 A1* | 6/2020 | Liu | ........................ G06V 10/50 |

FOREIGN PATENT DOCUMENTS

| | | |
|---|---|---|
| CN | 108805078 A | 11/2018 |
| CN | 109492514 A | 3/2019 |
| CN | 109508679 A | 3/2019 |
| CN | 110058694 A | 7/2019 |
| EP | 2659480 A1 | 11/2013 |

OTHER PUBLICATIONS

LC Technologies, Inc., International Search Report in PCT/US2006/012594, published under WO 2006/108017 A3 dated Nov. 15, 2007, 2 pgs.

Tencent Technology, ISR, PCT/CN2020/083486, dated Jul. 2, 2020, 2 pgs.

Tencent Technology, WO, PCT/CN2020/083486, dated Jul. 2, 2020, 5 pgs.

Tencent Technology, IPRP, PCT/CN2020/083486, dated Sep. 28, 2021, 6 pgs.

Hao Wang et al., "CosFace: Large Margin Cosine Loss for Deep Face Recognition", 2018 IEEE/CVF Conference on Computer Vision and Pattern Recognition, Nov. 17, 2018, 10 pgs.

* cited by examiner

METHOD AND APPARATUS FOR TRAINING GAZE TRACKING MODEL, AND METHOD AND APPARATUS FOR GAZE TRACKING

CROSS-REFERENCE TO RELATED APPLICATIONS

This application is a continuation application of PCT Patent Application No. PCT/CN2020/083486, entitled "SIGHT LINE TRACKING MODEL TRAINING METHOD, AND SIGHT LINE TRACKING METHOD AND DEVICE" filed on Apr. 7, 2020, which claims priority to Chinese Patent Application No. 201910338224.6, filed with the State Intellectual Property Office of the People's Republic of China on Apr. 24, 2019, and entitled "METHOD AND APPARATUS FOR TRAINING GAZE TRACKING MODEL, AND METHOD AND APPARATUS FOR GAZE TRACKING", all of which are incorporated herein by reference in their entirety.

FIELD OF THE TECHNOLOGY

This application relates to the field of artificial intelligence technologies, and specifically, to a method and apparatus for training a gaze tracking model, a method and apparatus for gaze tracking, a device, and a storage medium.

BACKGROUND OF THE DISCLOSURE

A visual tracking technology, also referred to as eye tracking technology, is a technology for obtaining current visual attention directions of subjects by using software algorithm, mechanical, electronic, and optical detection manners, which is widely applied to a plurality of fields such as human-computer interaction, assisted driving, psychological research, virtual reality, and military.

In the related art, gaze estimation is generally implemented by using geometric methods. The geometric methods generally require performing three-dimensional estimation on a gaze by using two light sources with the help of peripherals, such as a camera or an eye tracker.

In the related art, the implementation of gaze estimation using a geometric method requires the use of additional devices, which leads to a complex implementation process and high costs, limiting the application scenarios of gaze estimation.

SUMMARY

Embodiments of this application provide a method for training a gaze tracking model, to train a gaze tracking model by using a cosine distance between a predicted value and a labeled value as a model loss without the help of peripherals, to make it convenient to perform gaze tracking subsequently by using the gaze tracking model. The embodiments of this application further provide a corresponding apparatus, a device, and a storage medium.

According to a first aspect of this application, a method for training a gaze tracking model is provided, including:

obtaining a training sample set, the training sample set including training sample pairs, each training sample pair including an eye sample image and a labeled gaze vector corresponding to the eye sample image;

processing the eye sample images in the training sample set by using an initial gaze tracking model to obtain a predicted gaze vector of each eye sample image;

determining a model loss according to a cosine distance between the predicted gaze vector and the labeled gaze vector for each eye sample image; and iteratively adjusting one or more reference parameters of the initial gaze tracking model until the model loss meets a convergence condition, to obtain a target gaze tracking model.

According to a second aspect of this application, a method for gaze tracking is provided, including:

obtaining a target eye image;

processing the target eye image by using the target gaze tracking model to determine a predicted gaze vector of the target eye image; and performing gaze tracking according to the predicted gaze vector.

According to a third aspect of this application, an apparatus for training a gaze tracking model is provided, including:

an obtaining module, configured to obtain a training sample set, the training sample set including training sample pairs, each training sample pair including an eye sample image and a labeled gaze vector corresponding to the eye sample image;

a training module, configured to process the eye sample images in the training sample set by using an initial gaze tracking model to obtain a predicted gaze vector of each eye sample image;

a first processing module, configured to determine a model loss according to a cosine distance between the predicted gaze vector and the labeled gaze vector for each eye sample image; and a second processing module, configured to iteratively adjust one or more reference parameters of the initial gaze tracking model until the model loss meets a convergence condition, to obtain a target gaze tracking model.

According to a fourth aspect of this application, an apparatus for gaze tracking is provided, including:

an obtaining module, configured to obtain a target eye image;

a processing module, configured to process, by using the target gaze tracking model, the target eye image obtained by the obtaining module to determine a predicted gaze vector of the target eye image; and a gaze tracking module, configured to perform gaze tracking according to the predicted gaze vector obtained by the processing module.

According to a fifth aspect of this application, a computer device is provided, including a processor and a memory, the memory being configured to store program code, and the processor being configured to perform the method for training a gaze tracking model according to the first aspect according to instructions in the program code.

According to a sixth aspect of this application, a computer device is provided, including a processor and a memory, the memory being configured to store a target gaze tracking model, the target gaze tracking model being a gaze tracking model obtained through training according to the method for training a gaze tracking model according to the first aspect, and the processor being configured to run the target gaze tracking model to perform gaze tracking.

According to a seventh aspect of this application, a non-transitory computer-readable storage medium is provided, including instructions, the instructions, when run on a computer, causing the computer to perform the method for training a gaze tracking model according to the first aspect.

According to an eighth aspect of this application, a non-transitory computer-readable storage medium is provided, including instructions, the instructions, when run on a computer, causing the computer to perform the method for gaze tracking according to the second aspect.

As can be seen from the foregoing technical solutions, the embodiments of this application have at least the following advantages:

In the embodiments of this application, a training sample pair including an eye sample image and a corresponding labeled gaze vector is obtained, the eye sample image is processed by using an initial gaze tracking model to obtain a predicted gaze vector, and model training is then performed by using a cosine distance between the predicted gaze vector and the labeled gaze vector as a model loss to obtain a target gaze tracking model. When gaze tracking is performed subsequently, peripherals are not required, and it is only required that captured eye images are inputted to the target gaze tracking model. In this way, a gaze tracking procedure is simplified, a difference between a predicted value and a labeled value can be better represented by using the cosine distance as a model loss to train a model, to further improve prediction accuracy of the gaze tracking model obtained through training.

DESCRIPTION OF EMBODIMENTS

The embodiments of this application will be described in the following with reference to the accompanying drawings. It is obvious that the described embodiments are merely some rather than all of the embodiments of this application.

A person of ordinary skill in the art may know that as the technology evolves and a new scenario emerges, the technical solutions provided in the embodiments of this application are also applicable to a similar technical problem.

In this specification, the claims, and the accompanying drawings of this application, the terms "first", "second", and so on are intended to distinguish similar objects but do not necessarily indicate a specific order or sequence. It is to be understood that the data used in such a way is interchangeable in proper cases, so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

The embodiments of this application provide a method for training a gaze tracking model. The method uses a solution of calculating a cosine distance loss between a predicted value and a labeled value, which can better represent a difference between the predicted value and the labeled value, thereby ensuring higher prediction accuracy of an obtained gaze tracking model. The embodiments of this application further provide a corresponding apparatus, a device, and a storage medium. Detailed descriptions are separately provided below.

A visual tracking technology is a technology belonging to machine vision, which captures an image of an eyeball by using an image sensor, recognizes features of the eyeball by processing the image, and back-calculates a point of attention of a user in real time according to the features.

In an actual application, if a point of attention of the user may be obtained, it may be determined that the user is interested in content of the point of attention, and information at the point of attention may be enlarged. For example, if the point of attention is a small picture, the small picture may be enlarged to a large picture. A process of performing control according to an eyeball is briefly described by using FIG. 1 as an example.

Figure 1:
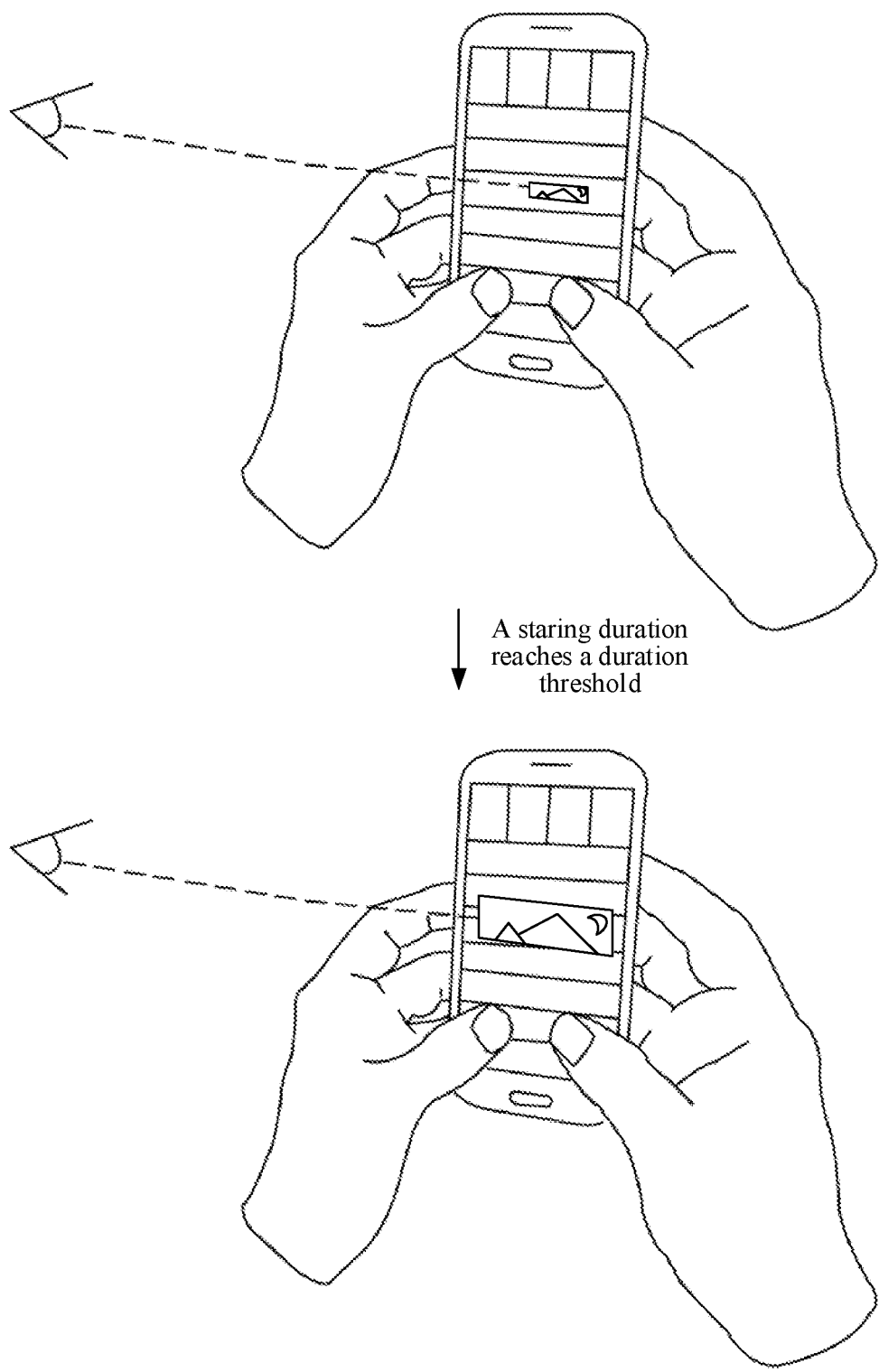
FIG. 1 is a schematic diagram of an example of an application scenario of gaze tracking according to an embodiment of this application.

As shown in FIG. 1, after a period of time for which a gaze of a user has stared at a point of a mobile phone exceeds a preset time, and an image capture apparatus of the mobile phone captures eye images within this period of time, content that the user stares at may be determined by analyzing the eye images. For example, if the user watches a small picture on the mobile phone all the time, and a staring duration reaches a duration threshold, the mobile phone may enlarge a display size of the picture on a screen, to better help the user to read information on which the user focuses.

In another application scenario, after the visual tracking technology is applied to a driver assistance system, the driver assistance system can capture eye images of a driver in real time and analyze the eye images, to determine a point of attention of an eyeball of the driver. If the point of attention deviates from a road, the driver assistance system can give a reminder (for example, give an audible alarm), to improve safety in a driving process.

The visual tracking technology changes an interaction path between a person and a computer device, and interaction with the computer device can be performed without manual operations, or the computer device may be controlled through motions of the eyeball.

In an actual operation process, the eyeball is similar to a click and select operation of a mouse. The eyeball may implement viewing options, to further activate controls such as a button control, an icon control, a link control, or a text control. Control of the eyeball over options may be that, if the eyeball stares at a point beyond a certain time, for example, hovers over a selectable target within a predetermined period of time such as 800 milliseconds, control over the selectable target may be implemented.

There may be many examples of performing control through the eyeball, and the examples are not listed one by one in the embodiments of this application.

In the embodiments of this application, each of the mobile phone in FIG. 1 and another terminal may analyze the point of attention of the user based on a target gaze tracking model, and the target gaze tracking model may be a deep learning model including a convolutional neural network. The target gaze tracking model is obtained through training by using a large amount of sample data. To determine the point of attention of the user accurately, an embodiment of this application provides a method for training a gaze tracking model, which may obtain a target gaze tracking model with higher prediction accuracy through training.

A process of training a gaze tracking model in the embodiments of this application is described below with reference to FIG. 2.

Figure 2:
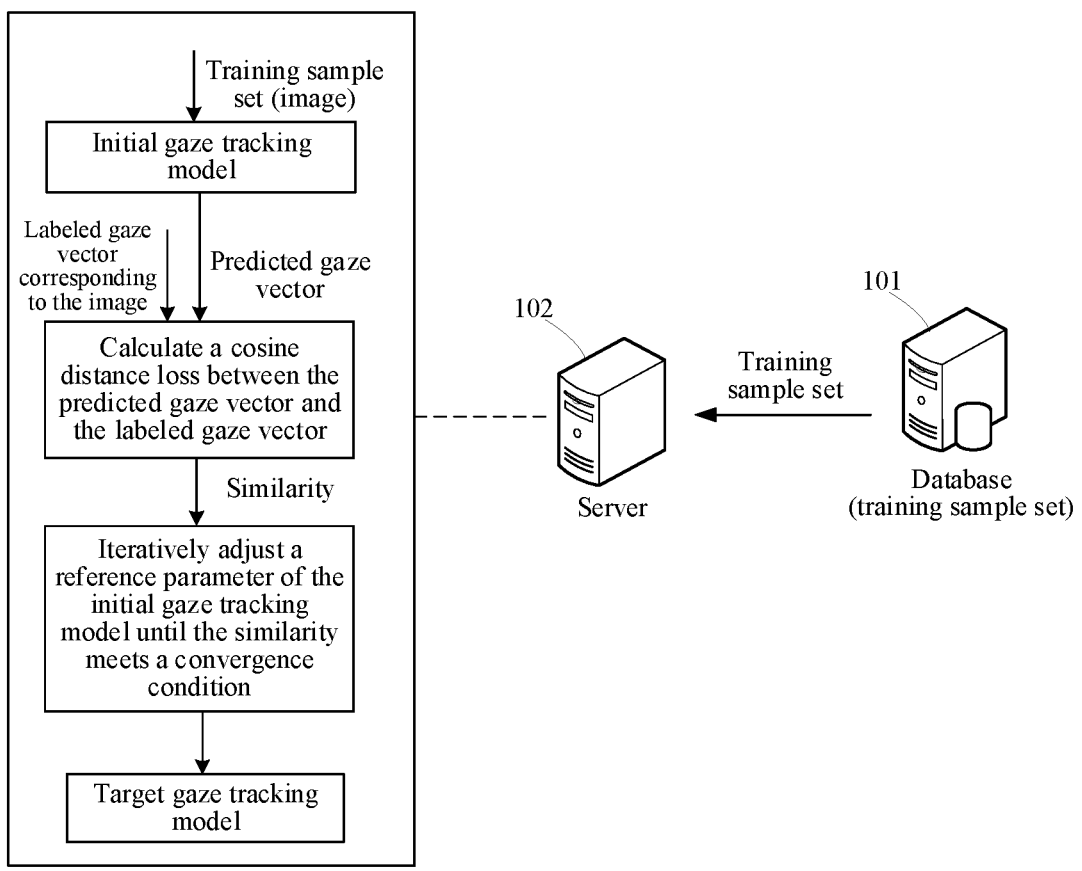
FIG. 2 is a schematic diagram of a scenario of training a gaze tracking model according to an embodiment of this application.

Referring to FIG. 2, FIG. 2 is a schematic diagram of an application scenario of training a gaze tracking model according to an embodiment of this application.

This scenario includes a database 101 and a server 102 that is configured to train a gaze tracking model, and the database 101 is connected to the server 102 by using a network. Certainly, the database 101 may be alternatively integrated on the server 102, and description is made by using an example in which the database is located on an independent device in this scenario. A training sample set on the database 101 includes a plurality of training sample pairs, where each training sample pair includes an eye sample image and a labeled gaze vector corresponding to the eye sample image. The training sample pairs may be specially created by a developer, or may be reported by users participating in an activity with rewards. Certainly, the training sample pairs in this application may be alternatively obtained in another manner, and a manner of obtaining the training sample pairs is not specifically limited in this application.

The database 101 can provide a training sample set for the server.

After obtaining the training sample set from the database 101 by using a network, the server 102 inputs the eye sample image to an initial gaze tracking model.

The server 102 processes the eye sample image by using the initial gaze tracking model to obtain a predicted gaze vector of the eye sample image.

The server 102 calculates a cosine distance loss between the predicted gaze vector and the labeled gaze vector, to determine a similarity between the predicted gaze vector and the labeled gaze vector.

The server 102 iteratively adjusts a reference parameter of the initial gaze tracking model until the similarity meets a convergence condition, to obtain a target gaze tracking model.

After generating the target gaze tracking model, the server 102 may further send the target gaze tracking model to a terminal device, to run the target gaze tracking model on the terminal device and implement a corresponding function by using the target gaze tracking model.

In a process that the server 102 trains the gaze tracking model, a cosine distance between the predicted gaze vector and the labeled gaze vector is used as a model loss, so that a difference between a predicted value and a labeled value can be better represented, thereby ensuring higher prediction accuracy of an obtained gaze tracking model.

The application scenario shown in FIG. 2 is only an example. In an actual application, the process of training a gaze tracking model provided in the embodiments of this application may be further applied to another application scenario, and an application scenario of the process of training a gaze tracking model is not limited herein.

It is to be understood that, the process of training a gaze tracking model provided in the embodiments of this application may be applied to a device having a model training function, such as a terminal device or a server. The terminal device may be specifically a smartphone, a computer, a personal digital assistant (PDA), a tablet computer, or the like, and the server may be specifically an application server, or may be a web server. During actual application deployment, the server may be an independent server, or may be a cluster server.

In an actual application, the terminal device and the server may train a gaze tracking model separately, or may interact with each other to train a gaze tracking model. When the terminal device and the server interactively train the gaze tracking model, the terminal device may obtain a training sample set from the server and then train the gaze tracking model by using the training sample set, or the server may obtain a training sample set from the terminal device and train the gaze tracking model by using the training sample set.

It is to be understood that after performing the process of training a gaze tracking model provided in the embodiments of this application and obtaining a target gaze tracking model through training, the terminal device or the server may send the target gaze tracking model to other terminal devices, to run the target gaze tracking model on the terminal devices and implement a corresponding function, or may send the target gaze tracking model to other servers, to run the target gaze tracking model on the other servers and implement a corresponding function by using the servers.

The following describes, through embodiments, a method for training a gaze tracking model provided in this application.

Figure 3:
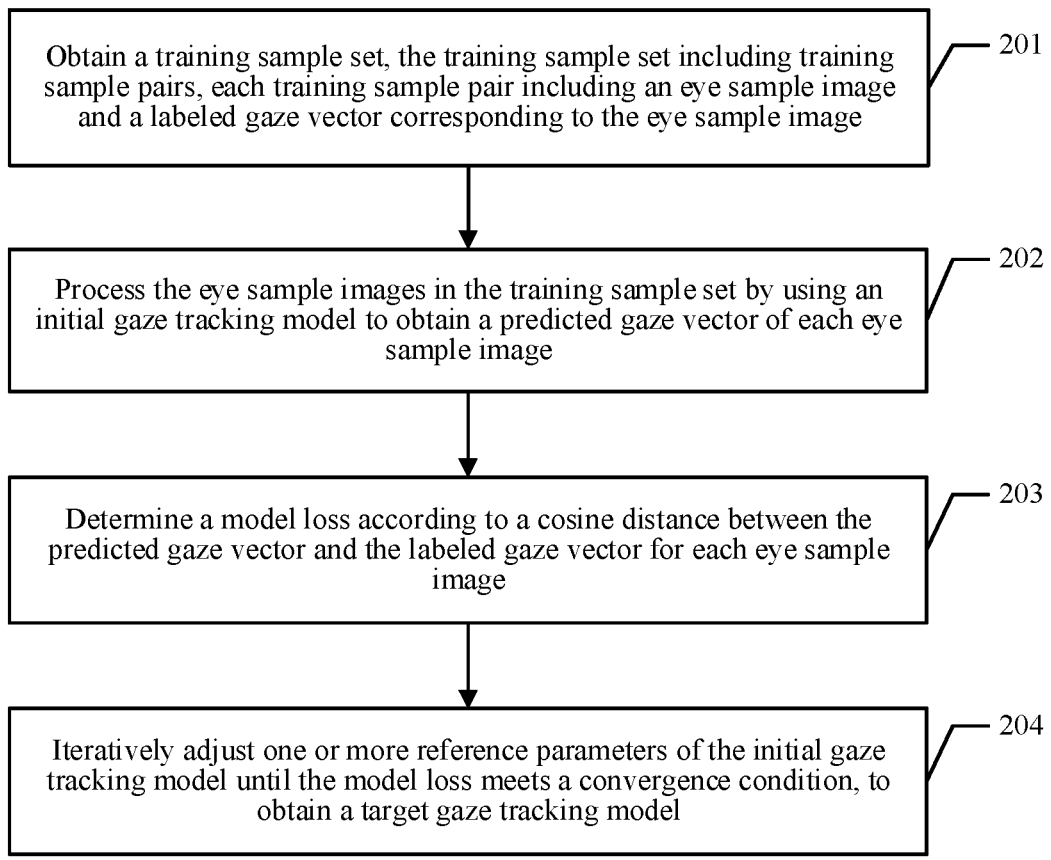
FIG. 3 is a schematic diagram of an embodiment of a method for training a gaze tracking model according to an embodiment of this application.

Referring to FIG. 3, FIG. 3 is a schematic diagram of an embodiment of a method for training a gaze tracking model according to an embodiment of this application. For ease of description, in the following embodiments, description is made by using a server as an execution body. It is to be understood that, the execution body of the method for training a gaze tracking model is not merely limited to a server, and the method may alternatively be applied to a device having a model training function such as a terminal device. As shown in FIG. 3, the method for training a gaze tracking model includes the following steps:

201. Obtain a training sample set, the training sample set including multiple training sample pairs, each training sample pair including an eye sample image and a labeled gaze vector corresponding to the eye sample image.

A labeled gaze vector is a real data label of a gaze direction of an eyeball in the eye sample image and is configured to supervise a training result in a training process, and the real data label may be also referred to as a ground truth. In the embodiments of this application, the labeled gaze vector is a three-dimensional spatial vector including x, y, and z dimensions.

The training sample set in the embodiments of this application may include an actual eye image and a labeled gaze vector corresponding to the image, and may further include a synthetic eye image and a labeled gaze vector corresponding to the synthetic eye image. The actual eye image refers to an eye image obtained through direct photographing by using devices such as a camera, and the synthetic eye image refers to an eye image synthesized by using a software tool. The training sample set in the embodiments of this application includes actual eye images and synthetic eye images, which may improve the robustness of the gaze tracking model.

202. Process the eye sample images in the training sample set by using an initial gaze tracking model to obtain a predicted gaze vector of each eye sample image.

In the embodiments of this application, a server constructs an initial gaze tracking model by using a deep learning method, and predicts a gaze vector corresponding to the eye sample image by using the model to obtain a predicted gaze vector. The predicted gaze vector is also a three-dimensional spatial vector.

In some implementations, the initial gaze tracking model includes a feature extraction network (configured to perform image feature extraction on the eye sample image) and a regression network (configured to perform regression on extracted image features to obtain a gaze vector).

203. Determine a model loss according to a cosine distance between the predicted gaze vector and the labeled gaze vector for each eye sample image.

Since both the labeled gaze vector and the predicted gaze vector are three-dimensional spatial vectors, to represent a difference between a predicted value and a labeled value more intuitively, in the embodiments of this application, the server determines a model loss according to a cosine distance between the labeled gaze vector and the predicted gaze vector and performs model training. The cosine distance is used for representing an angle formed between spatial vectors, and a smaller angle (that is, a larger cosine distance) between spatial vectors indicates a higher similarity between the spatial vectors; and conversely, a larger angle (that is, a smaller cosine distance) between spatial vectors indicates a lower similarity between the spatial vectors.

In some implementations, the cosine distance between the predicted gaze vector and the labeled gaze vector is $\cos(\theta)$, and the model loss is $1-\cos(\theta)$.

204. Iteratively adjust one or more reference parameters of the initial gaze tracking model until the model loss meets a convergence condition, to obtain a target gaze tracking model.

In some implementations, when the model loss does not meet the convergence condition, the server adjusts a reference parameter (or may be referred to as a model parameter or a network weight) of the initial gaze tracking model by using a stochastic gradient descent (SGD) algorithm, and performs prediction again by using a model after the parameter adjustment until the model loss meets the convergence condition. A process of adjusting the model parameter of the model to make the model loss meet the convergence condition is a process of making the predicted gaze vector tend to the labeled gaze vector.

Based on the above, in the embodiments of this application, a training sample pair including an eye sample image and a corresponding labeled gaze vector is obtained, the eye sample image is processed by using an initial gaze tracking model to obtain a predicted gaze vector, and model training is then performed by using a cosine distance between the predicted gaze vector and the labeled gaze vector as a model loss to obtain a target gaze tracking model. When gaze tracking is performed subsequently, peripherals are not required, and it is only required that captured eye images are inputted to the target gaze tracking model. In this way, a gaze tracking procedure is simplified, a difference between a predicted value and a labeled value can be better represented by using the cosine distance as a model loss to train a model, to further improve prediction accuracy of the gaze tracking model obtained through training.

In some implementations, the training sample pair further includes labeled coordinates of an eyeball in the eye sample image; and the processing the eye sample image by using an initial gaze tracking model to obtain a predicted gaze vector of the eye sample image may include:

processing the eye sample image by using the initial gaze tracking model, to obtain the predicted gaze vector of the eye sample image and predicted coordinates of the eyeball; and the method may further include:

determining the model loss according to a Euclidean distance between the predicted coordinates of the eyeball and the labeled coordinates of the eyeball.

In some implementations, in a process of training an initial gaze tracking model, in addition to training branches of the predicted gaze vector, branches of the predicted coordinates of the eyeball are also trained, thereby implementing multi-task learning (MTL). Therefore, the training sample pair further includes the labeled coordinates of the eyeball in the eye sample image. Correspondingly, after the initial gaze tracking model processes the eye sample image, the predicted coordinates of the eyeball are further outputted.

In some implementations, the predicted coordinates or the labeled coordinates of the eyeball refer to location coordinates of a central point of a pupil of the eyeball. In addition, the predicted coordinates and the labeled coordinates are two-dimensional space coordinates including x and y dimensions.

Different from representing a difference between a predicted value and a labeled value of the gaze vector by using the cosine distance, the server uses a Euclidean distance to represent a difference between a predicted value and a labeled value of the location coordinates, and uses the Euclidean distance as a part of the model loss to train the model. That is, the model loss of the gaze tracking model is formed by the cosine distance and the Euclidean distance.

In the embodiments of this application, when the gaze tracking model is trained, not only a predicted gaze vector is considered, but also predicted coordinates of the eyeball are considered, thereby further improving the robustness of the gaze tracking model and implementing MTL.

In some implementations, the labeled gaze vector is a unit circle-based direction vector (that is, a unit vector), and in another embodiment of a method for training a gaze tracking model according to an embodiment of this application, the method may further include:

normalizing the predicted gaze vector to obtain a normalized gaze vector; and the determining a model loss according to a cosine distance between the predicted gaze vector and the labeled gaze vector may include:

determining the model loss according to a cosine distance between the normalized gaze vector and the labeled gaze vector.

In the embodiments of this application, before a cosine distance loss between the predicted gaze vector and the labeled gaze vector is calculated, the predicted gaze vector is first normalized to obtain a normalized gaze vector, then a cosine distance between the normalized gaze vector and the labeled gaze vector is calculated, and a feature value may be normalized to make a calculation loss thereof fall within a unit circle, so as to finally make a prediction result more robust.

In some implementations, the processing the eye sample image by using an initial gaze tracking model to obtain a predicted gaze vector of the eye sample image may include:

performing at least one type of processing on the eye sample image, the at least one type of processing including: affine transformation, white balance, auto contrast, or Gaussian blur;

flipping a first eye sample image in the training sample set into a second eye sample image, and correspondingly flipping a labeled gaze vector corresponding to the first eye sample image, the second eye sample image being an image of an eye in a target direction, the initial gaze tracking model being configured to process the image of the eye in the target direction, the second eye sample image being a left eye sample image when the first eye sample image is a right eye sample image, and the second eye sample image being a right eye sample image when the first eye sample image is a left eye sample image;

performing wrapping on each eye sample image, to obtain a standard image; and mapping the standard image by using inverted residual blocks in the initial gaze tracking model to obtain a predicted gaze vector of the standard image.

In the embodiments of this application, processing such as affine transformation, white balance, auto contrast, or Gaussian blur is first performed on the eye sample image, to improve the generalization of the gaze tracking model.

The Gaussian blur may adjust pixel color values according to a Gaussian curve, to selectively blur an image. In other words, the Gaussian blur may collect statistics on pixel color values around a point according to a Gaussian curve, and obtain a color value of this curve by using a mathematical weighted average calculation method.

The auto contrast refers to measurement of different brightness levels between the brightest white and the darkest black in bright and dark regions in an image, where a larger difference range indicates larger contrast, and a smaller difference range indicates smaller contrast.

The affine transformation is an affine transformation or affine mapping geometrically defined between two vector spaces and is formed by a non-singular linear transformation and a translation transformation. In a case of limited dimensions, each affine transformation may be provided by a matrix A and a vector b, which may be written as A and an extra column b.

Certainly, in addition to the foregoing image preprocessing manners, the server may alternatively preprocess the image in other manners, to improve the generalization of the gaze tracking model obtained through training, which is not limited in this embodiment.

In some implementations, the gaze tracking model only processes an image of an eye in a target direction and obtains a predicted gaze vector, where the eye in the target direction may be a left eye or a right eye.

Correspondingly, the gaze tracking model in the embodiments of this application may be only trained for the left eye or may be only trained for the right eye. For example, if the model is only trained for the left eye, an image of the right eye may be flipped into an image of the left eye for model training, and after the image of the right eye is flipped into the image of the left eye, a corresponding labeled gaze vector also needs to be correspondingly flipped into a labeled gaze vector of the image of the left eye.

During prediction, the server first wraps an eye picture in a size required by the model from a picture including a face according to key points of left and right canthi, and a right eye picture is flipped into a left eye picture and inputted to the model for prediction.

When the gaze tracking model may predict gaze directions of left and right eye images, a process of flipping the image and the labeled gaze vector may be omitted in the training process, and details are not described in this embodiment again.

In some implementations, the method may further include:

flipping, when the standard image is obtained from the first eye sample image, the predicted gaze vector of the standard image back to a space corresponding to the first eye sample image.

In the embodiments of this application, when the model is a model to which a left eye image needs to be inputted, a right eye image is flipped into a left eye image and inputted to the model for prediction, and an obtained prediction result needs to be flipped back to a space of the right eye simultaneously.

In some implementations, the eye in the target direction is a left eye, and the method further includes:

obtaining a first horizontal coordinate value in a predicted gaze vector of the left eye and a second horizontal coordinate value in a predicted gaze vector of a right eye, the left eye and the right eye belonging to the same user object; and correcting the first horizontal coordinate value and the second horizontal coordinate value when the first horizontal coordinate value represents that the left eye looks to the left and the second horizontal coordinate value represents that the right eye looks to the right.

The correcting the first horizontal coordinate value and the second horizontal coordinate value may include:

determining an average value of a horizontal coordinate of the left eye and a horizontal coordinate of the right eye according to the first horizontal coordinate value and the second horizontal coordinate value;

adjusting the predicted gaze vector of the right eye and the predicted gaze vector of the left eye to be parallel to each other, the horizontal coordinate of the right eye after the adjustment being a third horizontal coordinate value; and determining a fourth horizontal coordinate value of the horizontal coordinate of the right eye according to the average value and the third horizontal coordinate value.

In a possible scenario, when symbols of x values in the predicted gaze vectors corresponding to the left eye image and the right eye image of the same object are opposite, the following two cases exist: the left eye and the right eye look to the two sides and the left eye and the right eye look to the middle. Apparently, the former case does not conform to a normal viewing habit of human eyes, and gaze vectors need to be corrected.

In some implementations, when the eye in the target direction is a left eye, if the predicted gaze vector corresponding to the left eye represents that the left eye looks to the left, and the predicted gaze vector corresponding to the right eye represents that the right eye looks to the right, the server needs to correct the gaze vector (of the right eye).

In a correction process, the server first determines the average value of the horizontal coordinate of the left eye and the horizontal coordinate of the right eye according to the first horizontal coordinate value and the second horizontal coordinate value, and adjusts the predicted gaze vector of the right eye and the predicted gaze vector of the left eye to be parallel to each other, to correct the horizontal coordinate of the predicted gaze vector of the right eye after the adjustment by using the average value, to make a corrected predicted gaze vector of the right eye and the predicted gaze vector of the left eye to be consistent with each other in a direction of an x axis.

When the eye in the target direction is a right eye, if the predicted gaze vector corresponding to the right eye represents that the right eye looks to the right, and the predicted gaze vector corresponding to the left eye represents that the left eye looks to the left, the server needs to correct the gaze vector (of the left eye). The correction process is not described in this embodiment again.

In the embodiments of this application, the gaze vectors of the left and right eyes obtained through prediction are properly corrected to obtain a final result.

In some implementations, a number of the inverted residual blocks is less than 19.

In the embodiments of this application, to enable the target gaze tracking model obtained through training to be applied to a mobile end, the gaze tracking model is wrapped, and the number of the inverted residual blocks may be reduced to only five through the wrapping, thereby reducing a model size of the target gaze tracking model, and making it convenient to deploy the model on the mobile end. Certainly, five here is only an example, and the number may be six, four, or another value.

Figure 4:
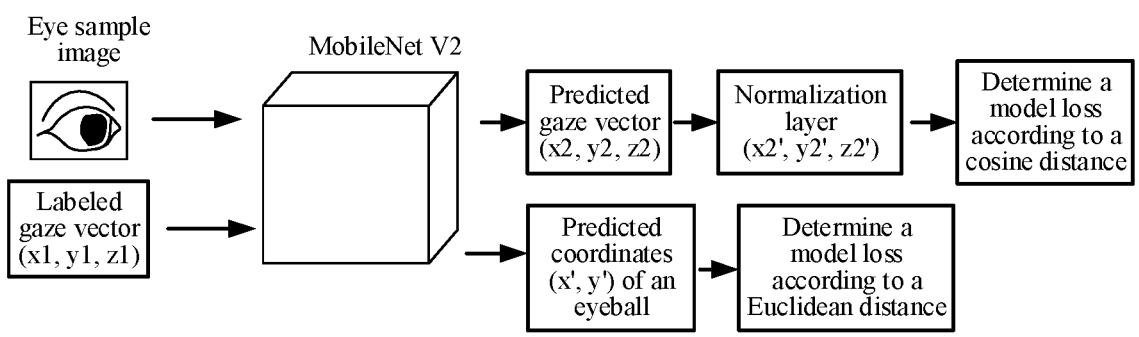
FIG. 4 is a schematic diagram of another embodiment of a method for training a gaze tracking model according to an embodiment of this application.

To further understand the solutions provided in the embodiments of this application, referring to FIG. 4, another method for training a gaze tracking model according to an embodiment of this application is described.

As shown in FIG. 4, in this embodiment of this application, MobileNet V2 is used as a backbone of a gaze tracking model. The MobileNet V2 includes a series of inverted residual blocks, to improve the model performance, enhance the expressiveness of model features, and reduce the amount of calculation.

Figure 5:
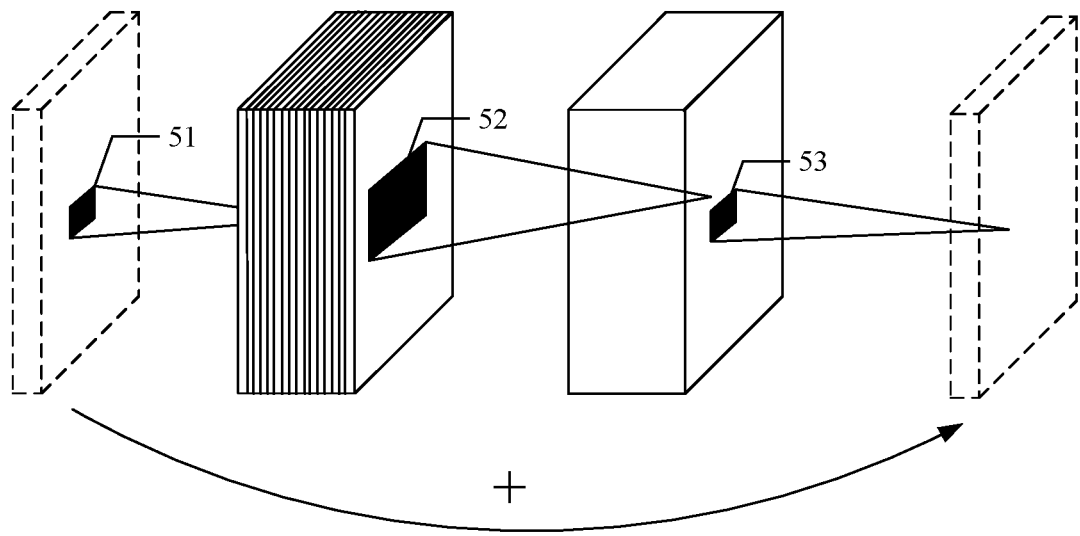
FIG. 5 is a schematic diagram of an embodiment of a feature processing process of inverted residual blocks according to an embodiment of this application.

A structural diagram of the inverted residual blocks is shown in FIG. 5. As can be seen from FIG. 5, the inverted residual blocks first enlarge dimensions of an inputted feature by using a 1×1 convolution 51, then obtain a more expressive feature through calculation by using a 3×3 depthwise convolution 52, and finally reduce channel dimensions by using a 1×1 convolution 53, to finally perform feature concatenation on the originally inputted feature and an outputted feature. Input dimensions of the depthwise convolution are increased by using the 1×1 convolution, which can effectively alleviate a situation of feature degradation.

A structure of the MobileNet V2 provided in this embodiment of this application is a wrapped MobileNet V2, the number of the inverted residual blocks is reduced to five, and a number of channels outputted by each layer is correspondingly reduced, to make it convenient to deploy the model on the mobile end.

A structural diagram of the wrapped MobileNet V2 may be understood with reference to Table 1.

TABLE 1

| Structure of wrapped MobileNet V2 | | | | | |
|---|---|---|---|---|---|
| Input | Operator | t | c | n | s |
| $112^2*3$ | Convolution (conv2d) | — | 32 | 1 | 2 |
| $56^2*32$ | bottleneck | 1 | 16 | 1 | 1 |
| $28^2*16$ | bottleneck | 6 | 24 | 1 | 2 |
| $14^2*64$ | bottleneck | 6 | 96 | 1 | 1 |
| $7^2*96$ | bottleneck | 6 | 1280 | 1 | 1 |

TABLE 1-continued

| Structure of wrapped MobileNet V2 | | | | | |
|---|---|---|---|---|---|
| Input | Operator | t | c | n | s |
| $7^2*1280$ | bottleneck | — | — | 1 | 1 |
| $1*1*1280$ | conv2d 1*1 | — | k | — | — |

In Table 1, t represents a dilation factor, c represents dimensions of an output channel of a current sequence, n represents the number of times of repetition in a current layer, and s represents a stride.

The initial gaze tracking model in the embodiments of this application is not limited to the MobileNet V2 model provided above, and may alternatively be a model of another structure or another type.

The MobileNet V2 model first processes an inputted eye sample image, for example, processes the image through affine transformation, white balance, auto contrast, or Gaussian blur to perform data enhancement, to improve the generalization of the model.

A feature representation obtained by performing multi-level mapping on the eye sample image by the MobileNet V2 model is configured to establish a regressor of a predicted gaze vector and coordinates of an eyeball.

The labeled gaze vector of the eye sample image on three directions of a space may be represented as (x1, y1, z1), the predicted gaze vector of the eye sample image, that is, an output of a fully connected layer is (x2, y2, z2), and an output of the coordinates of the eyeball is (x', y'). The z2 of the predicted gaze vector is mainly used for normalization of vectors.

The gaze regressor in the embodiments of this application calculates a cosine distance loss between the predicted gaze vector and the labeled gaze vector, considering that the labeled gaze vector is a unit circle-based direction vector, and an angular difference between the predicted gaze vector obtained through learning and the labeled gaze vector may be well represented by calculating the cosine distance loss, so that a prediction result is closer to an actual value.

The coordinates of the eyeball are not directly correlated to the angles and are 2D coordinates, so that a Euclidean distance (L2 distance loss) is used as a loss function. Before the cosine distance loss is calculated, a normalization layer is added in this application, and a feature value is normalized, to make a calculation loss thereof fall within a unit circle, so as to finally make a prediction result more robust.

A normalization method provided in the embodiments of this application may be understood with reference to the following formulas:

$x2'=(x2-\mu)/\sigma$, $y2'=(y2-\mu)/\sigma$, and $z2'=(z2-\mu)/\sigma$, where $\mu$ is an average value of x2, y2, and z2, and $\sigma$ is a variance of x2, y2, and z2.

After normalization, a cosine distance between the predicted gaze vector and the labeled gaze vector is determined and may be represented by using the following formula:

$$\cos(\theta) = \frac{a \cdot b}{|a||b|} \quad (6)$$

where a is the labeled gaze vector, and b is the predicted gaze vector. The formula calculates a similarity between the two vectors, so that a larger value indicates that the two vectors are closer. Actually, the network calculates a loss between the two vectors through 1−cos(θ), and a smaller value indicates that the two vectors are closer.

In the embodiments of this application, a 112px×112px left eye picture may be inputted. During training, all right eye pictures may be flipped into left eye pictures, and the same flipping operation is also performed on labeled gaze vectors. If labeled coordinates of an eyeball also exist, a flipping operation also needs to be performed on the labeled coordinates.

During prediction, a picture having a face first wraps a left eye and a right eye into eye pictures in a model input size according to key points of left and right canthi, and the right eye picture is flipped into a left eye picture and inputted to the model for prediction. An obtained prediction result needs to be flipped back to a space of the right eye simultaneously, and left eye and right eye gaze vectors obtained through network prediction are properly corrected to obtain a final result.

The method for training a gaze tracking model is described in the foregoing embodiments, and after a target gaze tracking model is trained, the target gaze tracking model may be applied to different actual scenarios. A predicted gaze vector needs to be obtained regardless of which scenario the target gaze tracking model is applied to, to implement a corresponding gaze tracking process.

Figure 6:
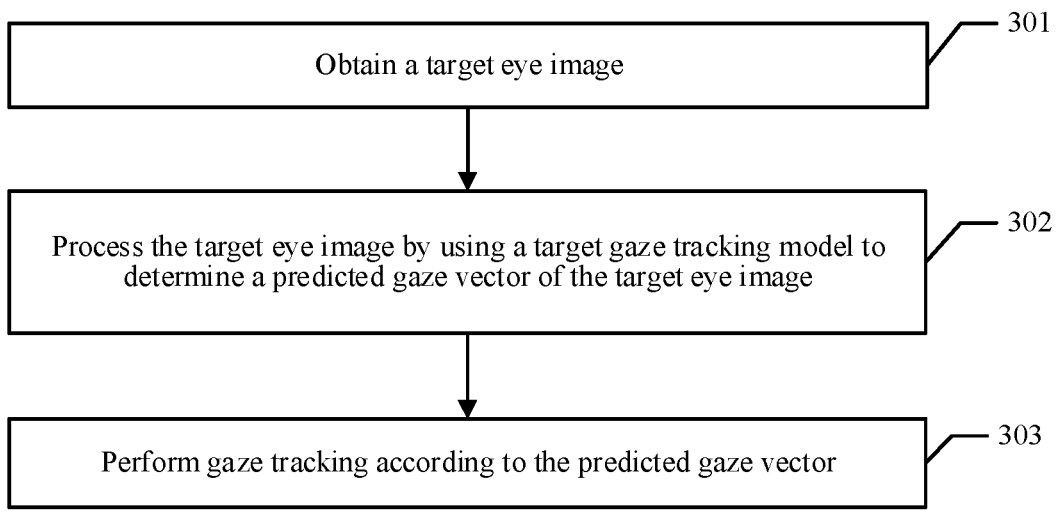
FIG. 6 is a schematic diagram of an embodiment of a method for gaze tracking according to an embodiment of this application.

As shown in FIG. 6, an embodiment of the method for gaze tracking according to an embodiment of this application may include:

301. Obtain a target eye image.

302. Process the target eye image by using a target gaze tracking model to determine a predicted gaze vector of the target eye image.

The target gaze tracking model is a gaze tracking model obtained according to the method for training a gaze tracking model described above.

303. Perform gaze tracking according to the predicted gaze vector.

In some implementations, in a case of processing the target eye image by using a target gaze tracking model to determine a predicted gaze vector of the target eye image, the method may further include:

determining coordinates of an eyeball in the target eye image; and the performing gaze tracking according to the predicted gaze vector may include:

performing, by using the coordinates of the eyeball as a gaze starting point, gaze tracking according to a direction indicated by the predicted gaze vector.

In the embodiments of this application, a process of determining a predicted gaze vector of the target eye image may be understood with reference to the foregoing process of determining a predicted gaze vector of the eye sample image, and details are not described herein again.

In a possible application scenario, when a gaze of an eye in a video stream is tracked by using the target gaze tracking model, since a position of an eye region wrapped from a video frame jitters, and the target gaze tracking model performs independent processing on an eye image in each video frame and does not have a context-awareness capability (that is, a processing result is not affected by a processing result corresponding to a previous video frame), a gaze direction that is subsequently predicted also jitters.

To alleviate the jitter of a gaze direction without complicating the model, smoothing may be performed on a predicted gaze vector corresponding to a current target eye image by using a smoothing algorithm and by using a gaze vector prediction result corresponding to an eye image in a video frame before the current target eye image.

In some implementations, after the predicted gaze vector of the target eye image is determined, when the target eye image belongs to a video frame in a video stream, a reference eye image corresponding to the target eye image is determined, the reference eye image and the target eye image being images in consecutive video frames in the video stream; and smoothing is performed on the predicted gaze vector corresponding to the target eye image according to a predicted gaze vector corresponding to the reference eye image.

In an exemplary example, when the target eye image is an $i^{th}$ video frame, the terminal determines at least one video frame (for example, an $(i-1)t^h$ video frame, an $(i-2)t^h$ video frame, and an $(i-3)^{th}$ video frame) before the $i^{th}$ video frame as a reference video frame, and performs smoothing on a predicted gaze vector of the $i^{th}$ video frame according to a predicted gaze vector corresponding to an eye image in the reference video frame.

A Bezier curve may be used during smoothing, and the Bezier curve may be a first-order, a second-order, or a third-order Bezier curve, which is not limited in this embodiment.

Using a third-order Bezier curve as an example, a smoothing formula of the third-order Bezier curve is as follows:

$$B(t)=P_0(1-t)^3+3P_1t(1-t)^2+3P_2t^2(1-t)+P_3t^3$$

where B(t) is a predicted gaze vector corresponding to the current target eye image after the smoothing, Pi is a predicted gaze vector corresponding to the reference eye image, and t is an introduced parameter and ranges from 0 to 1.

Figure 7:
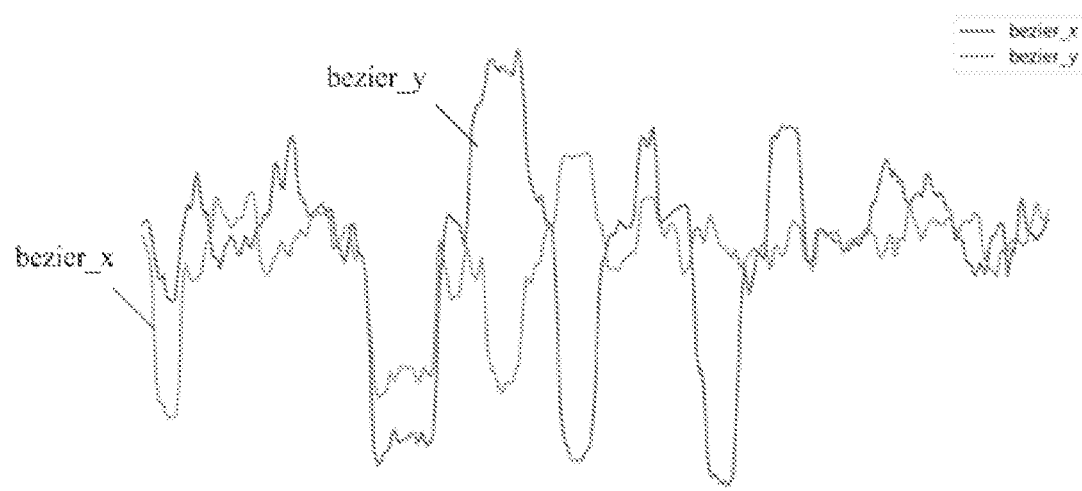
FIG. 7 is a schematic diagram of a processing result of a third-order Bezier curve according to an embodiment of this application.

As can be seen from FIG. 7, after the smoothing of the Bezier curve, jitters of an x value and a y value in the predicted gaze vector become increasingly small, and the gaze vector is more stable.

Certainly, in addition to performing smoothing by using the Bezier curve, smoothing may be alternatively performed by using a weighted moving average algorithm and an exponential smoothing algorithm, which is not limited in this embodiment.

For the method for training a gaze tracking model described above, this application further provides a corresponding apparatus for training a gaze tracking model, so that the method for training a gaze tracking model can be applied and implemented in practice.

Figure 8:
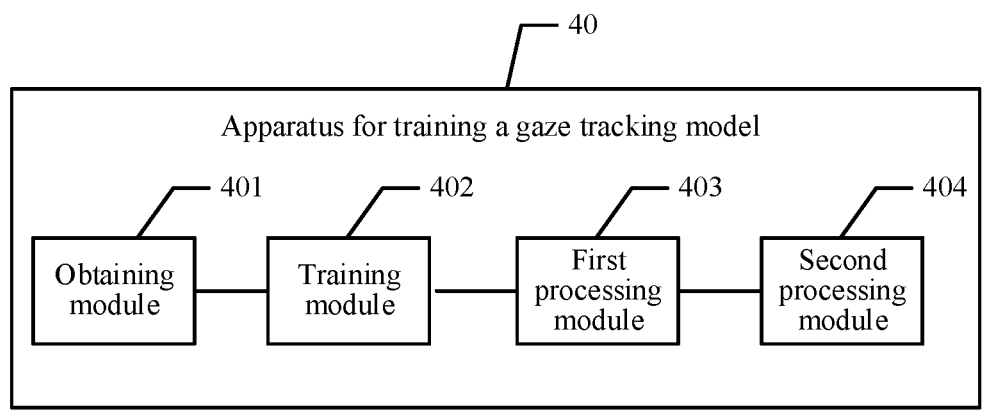
FIG. 8 is a schematic diagram of an embodiment of an apparatus for training a gaze tracking model according to an embodiment of this application.

Referring to FIG. 8, FIG. 8 is a schematic diagram of an embodiment of an apparatus 40 for training a gaze tracking model according to an embodiment of this application, and the apparatus includes:

an obtaining module 401, configured to obtain a training sample set, the training sample set including multiple training sample pairs, each training sample pair including an eye sample image and a labeled gaze vector corresponding to the eye sample image;

a training module 402, configured to process, by using an initial gaze tracking model, the eye sample images obtained by the obtaining module 401 to obtain a predicted gaze vector of each eye sample image;

a first processing module 403, configured to determine a model loss according to a cosine distance between the predicted gaze vector obtained by the training module 402 and the labeled gaze vector for each eye sample image; and a second processing module 404, configured to iteratively adjust one or more reference parameters of the initial gaze tracking model until the model loss obtained by the first processing module 403 meets a convergence condition, to obtain a target gaze tracking model.

In the embodiments of this application, a training sample pair including an eye sample image and a corresponding labeled gaze vector is obtained, the eye sample image is processed by using an initial gaze tracking model to obtain a predicted gaze vector, and model training is then performed by using a cosine distance between the predicted gaze vector and the labeled gaze vector as a model loss to obtain a target gaze tracking model. When gaze tracking is performed subsequently, peripherals are not required, and it is only required that captured eye images are inputted to the target gaze tracking model. In this way, a gaze tracking procedure is simplified, a difference between a predicted value and a labeled value can be better represented by using the cosine distance as a model loss to train a model, to further improve prediction accuracy of the gaze tracking model obtained through training.

In some implementations, the training module 402 is configured to process, when each training sample pair further includes labeled coordinates of an eyeball in the eye sample image, the eye sample image by using the initial gaze tracking model, to obtain the predicted gaze vector of the eye sample image and predicted coordinates of the eyeball; and the first processing module 403 is further configured to determine the model loss according to a Euclidean distance between the predicted coordinates of the eyeball and the labeled coordinates of the eyeball.

Figure 9:
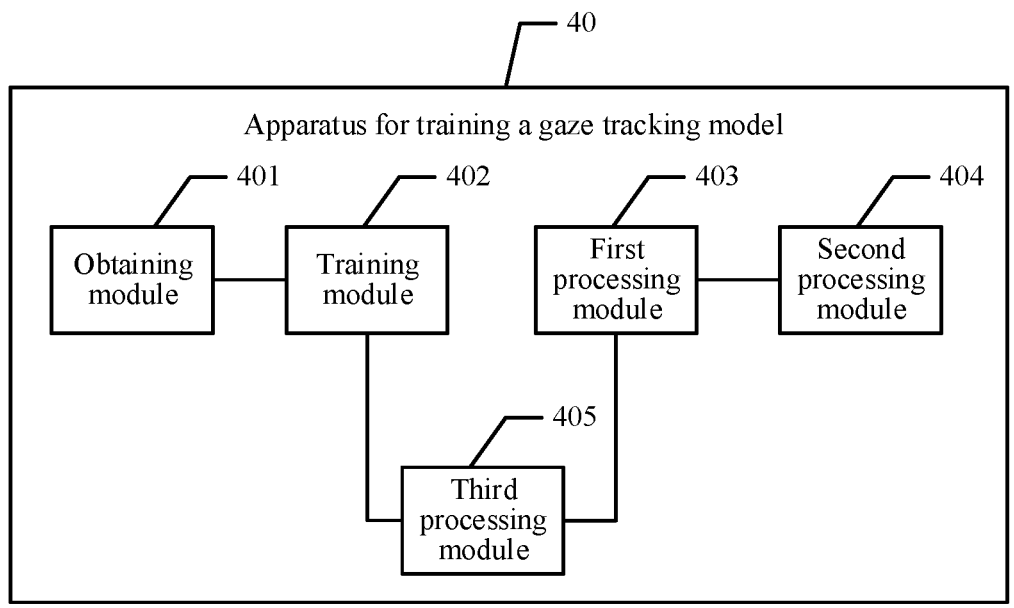
FIG. 9 is a schematic diagram of another embodiment of an apparatus for training a gaze tracking model according to an embodiment of this application.

In some implementations, referring to FIG. 9, the apparatus 40 further includes:

a third processing module 405, configured to normalize the predicted gaze vector to obtain a normalized gaze vector; and the first processing module 403 is configured to determine the model loss according to a cosine distance between the normalized gaze vector and the labeled gaze vector.

In some implementations, the training module 402 is configured to:

perform at least one type of processing on the eye sample image, the at least one type of processing including: affine transformation, white balance, auto contrast, or Gaussian blur;

flip a first eye sample image in the training sample set into a second eye sample image, and correspondingly flip a labeled gaze vector corresponding to the first eye sample image, the second eye sample image being an image of an eye in a target direction, the initial gaze tracking model being configured to process the image of the eye in the target direction, the second eye sample image being a left eye sample image when the first eye sample image is a right eye sample image, and the second eye sample image being a right eye sample image when the first eye sample image is a left eye sample image;

perform wrapping on each eye sample image, to obtain a standard image; and map the standard image by using inverted residual blocks in the initial gaze tracking model to obtain a predicted gaze vector of the standard image.

In some implementations, the training module 402 is further configured to flip, when the standard image is obtained from the first eye sample image, the predicted gaze vector of the standard image back to a space corresponding to the first eye sample image.

In some implementations, the eye in the target direction is a left eye, and the training module 402 is further configured to:

obtain a first horizontal coordinate value in a predicted gaze vector of the left eye and a second horizontal coordinate value in a predicted gaze vector of a right eye, the left eye and the right eye belonging to the same user object; and correct the first horizontal coordinate value and the second horizontal coordinate value when the first horizontal coordinate value represents that the left eye looks to the left and the second horizontal coordinate value represents that the right eye looks to the right.

In some implementations, the training module 402 is configured to:

determine an average value of a horizontal coordinate of the left eye and a horizontal coordinate of the right eye according to the first horizontal coordinate value and the second horizontal coordinate value;

adjust the predicted gaze vector of the right eye and the predicted gaze vector of the left eye to be parallel to each other, the horizontal coordinate of the right eye after the adjustment being a third horizontal coordinate value; and determine a fourth horizontal coordinate value of the horizontal coordinate of the right eye according to the average value and the third horizontal coordinate value.

In some implementations, a number of the inverted residual blocks is less than 19.

For the method for gaze tracking described above, this application further provides a corresponding apparatus for gaze tracking, so that the method for gaze tracking can be applied and implemented in practice.

Figure 10:
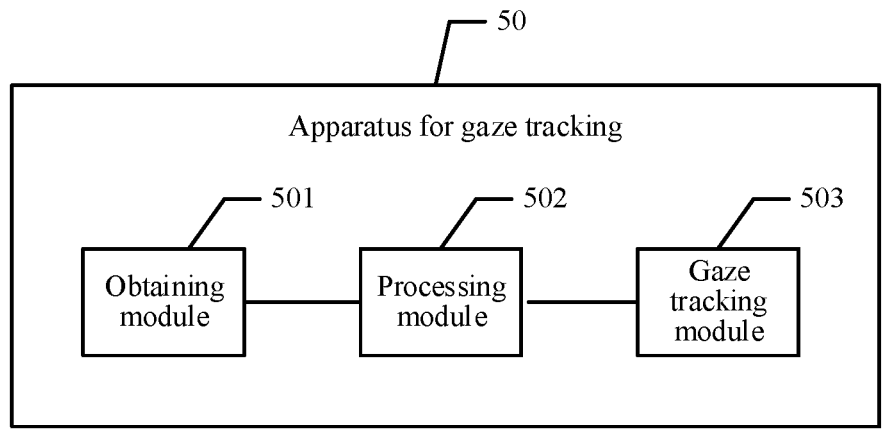
FIG. 10 is a schematic diagram of an embodiment of an apparatus for gaze tracking according to an embodiment of this application.

FIG. 10 is a schematic diagram of an embodiment of an apparatus 50 for gaze tracking according to an embodiment of this application, and the apparatus includes:

an obtaining module 501, configured to obtain a target eye image;

a processing module 502, configured to process, by using a target gaze tracking model, the target eye image obtained by the obtaining module 501 to determine a predicted gaze vector of the target eye image; and a gaze tracking module 503, configured to perform gaze tracking according to the predicted gaze vector obtained by the processing module 502.

In some implementations, the processing module 502 is further configured to determine coordinates of an eyeball in the target eye image; and the gaze tracking module 503 is configured to perform, by using the coordinates of the eyeball as a gaze starting point, gaze tracking according to a direction indicated by the predicted gaze vector.

In some implementations, the apparatus 50 for gaze tracking may further include a smoothing module, and the smoothing module is configured to:

determine, when the target eye image belongs to a video frame in a video stream, a reference eye image corresponding to the target eye image, the reference eye image and the target eye image being images in consecutive video frames in the video stream; and perform smoothing on the predicted gaze vector corresponding to the target eye image according to a predicted gaze vector corresponding to the reference eye image.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 11:
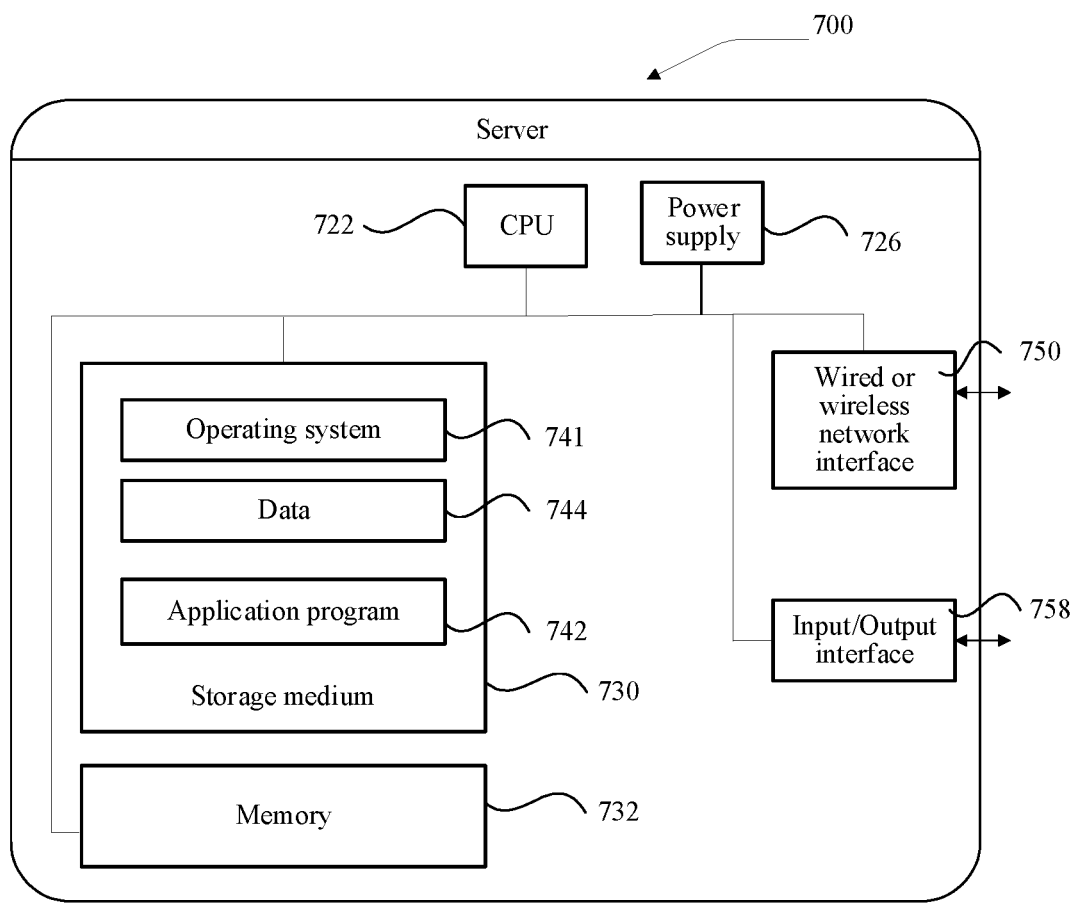
FIG. 11 is a schematic diagram of an embodiment of a server according to an embodiment of this application.

This application further provides a computer device for training a gaze tracking model. The device may be specifically a server. Referring to FIG. 11, FIG. 11 is a schematic structural diagram of a server for training a gaze tracking model according to an embodiment of this application. The server 700 may vary greatly due to different configurations or performance, and may include one or more central processing units (CPUs) 722 (for example, one or more processors), a memory 732, and one or more storage media 730 (for example, one or more mass storage devices) that store an application program 742 or data 744. The memory 732 and the storage medium 730 may be transient storage or persistent storage. The program stored in the storage medium 730 may include one or more modules (not marked in the figure), and each module may include a series of instruction operations to the server. Still further, the CPU 722 may be configured to communicate with the storage medium 730 to perform the series of instruction operations in the storage medium 730 on the server 700.

The server 700 may further include one or more power supplies 726, one or more wired or wireless network interfaces 750, one or more input/output interfaces 758, and/or one or more operating systems 741 such as Windows Server™, Mac OS X™, Unix™, Linux™, and FreeBSD™.

The steps performed by the server in the foregoing embodiments may be based on the server structure shown in FIG. 11.

The CPU 722 is configured to perform the process of training a gaze tracking model described in FIG. 1 to FIG. 6.

In addition, this application further provides a server, and a structure of the server is similar to a structure of the server shown in FIG. 11. A memory thereof is configured to store a target gaze tracking model, and the target gaze tracking model is obtained through training according to the method for training a gaze tracking model provided in the embodiments of this application. A processor thereof is configured to run the target gaze tracking model to perform gaze tracking.

Figure 12:
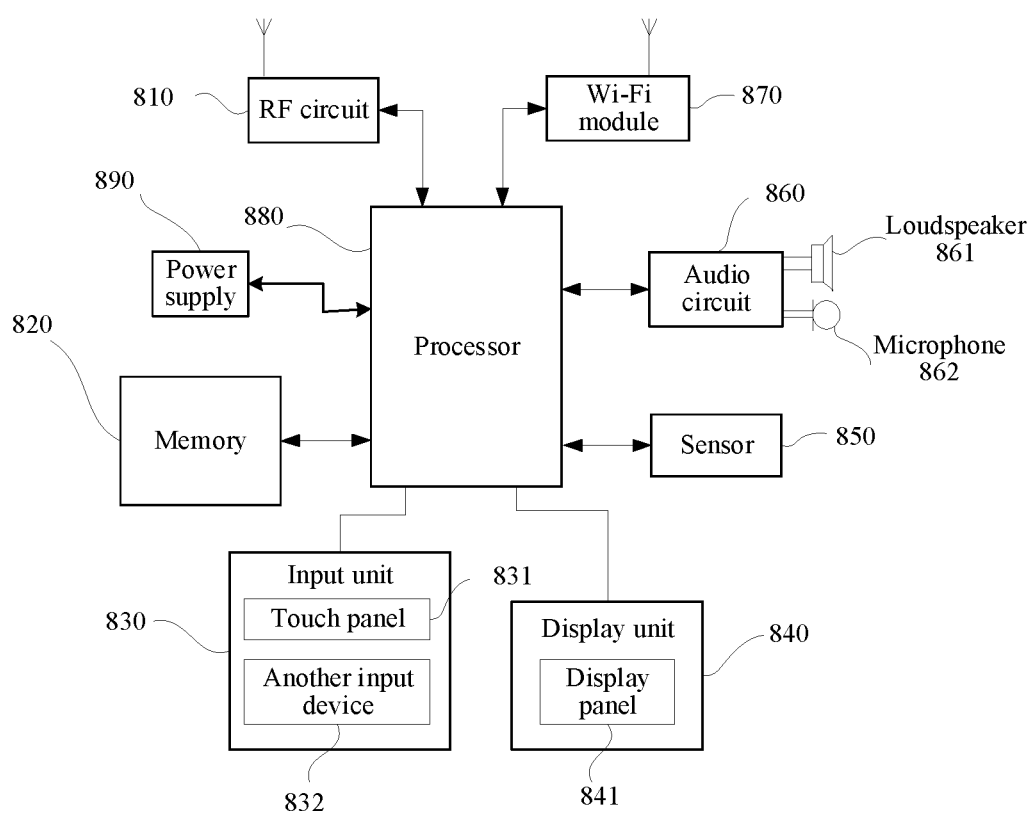
FIG. 12 is a schematic diagram of an embodiment of a terminal device according to an embodiment of this application.

The embodiments of this application further provide another device for gaze tracking. The device may be a terminal device. As shown in FIG. 12, for ease of description, only parts related to the embodiments of this application are shown. For specific technical details that are not disclosed, refer to the method part in the embodiments of this application. The terminal may be any terminal device including a mobile phone, a tablet computer, a personal digital assistant (PDA), a point of sales (POS), an on-board computer, or the like. For example, the terminal is a mobile phone.

FIG. 12 shows a block diagram of a partial structure of a mobile phone related to the terminal according to an embodiment of this application. Referring to FIG. 12, the mobile phone includes components such as a radio frequency (RF) circuit 810, a memory 820, an input unit 830, a display unit 840, a sensor 850, an audio circuit 860, a wireless fidelity (Wi-Fi) module 870, a processor 880, and a power supply 890. A person skilled in the art may understand that the structure of the mobile phone shown in FIG. 12 does not constitute any limitation on the mobile phone, and instead, the mobile phone may include more or fewer components than those shown in the figure, or some components may be combined, or a different component deployment may be used.

The following makes a detailed description of the components of the mobile phone with reference to FIG. 12.

The RF circuit 810 may be configured to receive and send signals during an information receiving and sending process or a call process. Specifically, the RF circuit 810 receives downlink information from a base station, then delivers the downlink information to the processor 880 for processing, and sends designed uplink data to the base station. Generally, the RF circuit 810 includes, but is not limited to, an antenna, at least one amplifier, a transceiver, a coupler, a low noise amplifier (LNA), a duplexer, and the like. In addition, the RF circuit 810 may alternatively communicate with a network and another device through wireless communication. The wireless communication may use any communication standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 820 may be configured to store a software program and a module. The processor 880 runs the software program and the module that are stored in the memory 820, to implement various functional applications and data processing of the mobile phone. The memory 820 may mainly include a program storage area and a data storage area. The program storage area may store an operating system, an application program required by at least one function (for example, a sound playback function and an image display function), and the like. The data storage area may store data (for example, audio data and an address book) created according to the use of the mobile phone, and the like. In addition, the memory 820 may include a high speed random access memory, and may further include a non-volatile memory, such as at least one magnetic disk storage device, a flash memory, or another volatile solid-state storage device.

The input unit 830 may be configured to control instructions, and generate a key signal input related to the user setting and function control of the mobile phone. Specifically, the input unit 830 may include a touch panel 831 and another input device 832. The touch panel 831, also referred to as a touchscreen, may collect a touch operation of a user on or near the touch panel (such as an operation of a user on or near the touch panel 831 by using any suitable object or accessory such as a finger or a stylus), and drive a corresponding connection apparatus according to a preset program. In some implementations, the touch panel 831 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 880. In addition, the touch controller can receive a command transmitted by the processor 880 and execute the command. In addition, the touch panel 831 may be implemented by using various types, such as a resistive type, a capacitive type, an infrared type, and a surface acoustic wave type. In addition to the touch panel 831, the input unit 830 may further include the other input device 832. Specifically, the other input device 832 may include, but is not limited to, one or more of a physical keyboard, a functional key (such as a volume control key or a switch key), a track ball, a mouse, and a joystick.

The display unit 840 may be configured to display a gaze tracking result. The display unit 840 may include a display panel 841. In some implementations, the display panel 841 may be configured by using a liquid crystal display (LCD), an organic light-emitting diode (OLED), or the like. Further, the touch panel 831 may cover the display panel 841. After detecting a touch operation on or near the touch panel, the touch panel 831 transfers the operation to the processor 880 to determine a touch event type. Then the processor 880 provides corresponding visual output on the display panel 841 according to the touch event type. Although in FIG. 12, the touch panel 831 and the display panel 841 are used as two separate parts to implement input and output functions of the mobile phone, in some embodiments, the touch panel 831 and the display panel 841 may be integrated to implement the input and output functions of the mobile phone.

The mobile phone may further include at least one sensor 850 to capture a target eye image by using the sensor 850. Certainly, the target eye image may be alternatively captured by using a camera or an eye tracker. The sensor 850 may be, for example, an optical sensor, a motion sensor, or another sensor. Specifically, the optical sensor may include an ambient light sensor and a proximity sensor. The ambient light sensor may adjust luminance of the display panel 841 according to brightness of the ambient light. The proximity sensor may switch off the display panel 841 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 860, a loudspeaker 861, and a microphone 862 may provide audio interfaces between the user and the mobile phone. The audio circuit 860 may convert received audio data into an electrical signal and transmit the electrical signal to the loudspeaker 861. The loudspeaker 861 converts the electrical signal into a sound signal for output. On the other hand, the microphone 862 converts a collected sound signal into an electrical signal. The audio circuit 860 receives the electrical signal and converts the electrical signal into audio data, and outputs the audio data to the processor 880 for processing. Then, the processor 880 sends the audio data to, for example, another mobile phone by using the RF circuit 810, or outputs the audio data to the memory 820 for further processing.

Wi-Fi is a short distance wireless transmission technology. The mobile phone may help, by using the Wi-Fi module 870, a user to receive and transmit an email, browse a web page, access stream media, and the like. This provides wireless broadband Internet access for the user. Although FIG. 12 shows the Wi-Fi module 870, it may be understood that the Wi-Fi module is not a necessary component of the mobile phone, and the Wi-Fi module may be omitted as required provided that the scope of the essence of the present disclosure is not changed.

The processor 880 is a control center of the mobile phone, and is connected to various parts of the entire mobile phone by using various interfaces and lines. By running or executing the software program and/or the module stored in the memory 820, and invoking data stored in the memory 820, the processor 880 executes various functions of the mobile phone and performs data processing, thereby monitoring the entire mobile phone. In some implementations, the processor 880 may include one or more processing units. Exemplarily, the processor 880 may integrate an application processor and a modem processor. The application processor mainly processes an operating system, a user interface, an application program, and the like. The modem processor mainly processes wireless communication. It may be understood that the foregoing modem processor may either not be integrated into the processor 880.

The mobile phone further includes the power supply 890 (such as a battery) for supplying power to the components. Exemplarily, the power supply may be logically connected to the processor 880 by using a power management system, thereby implementing functions such as charging, discharging, and power consumption management by using the power management system.

Although not shown in the figure, the mobile phone may further include a camera, a Bluetooth module, and the like. Details are not described herein again.

In the embodiments of this application, the processor 880 included in the terminal has the foregoing function of performing corresponding gaze tracking based on the target gaze tracking model.

An embodiment of this application further provides a computer-readable storage medium, to store program code. The program code is used for performing any implementation in a method for training a gaze tracking model described in the foregoing embodiments, or performing a method for gaze tracking described in the foregoing embodiments.

An embodiment of this application further provides a computer program product including instructions. When the computer program product runs on a computer, the computer is caused to perform any implementation of a method for training a gaze tracking model described in the foregoing embodiments, or perform a method for gaze tracking described in the foregoing embodiments.

A person skilled in the art can clearly understand that for convenience and conciseness of description, for specific working processes of the foregoing systems, devices and units, reference may be made to the corresponding processes in the foregoing method embodiments, and details are not described herein again.

In the several embodiments provided in this application, it is to be understood that the disclosed system, apparatus, and method may be implemented in other manners. For example, the described apparatus embodiment is merely an example. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of this application may be integrated into one processing unit, or each of the units may be physically separated, or two or more units may be integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the related art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disk.

The foregoing embodiments are merely intended for describing the technical solutions of this application, but not for limiting this application. Although this application is described in detail with reference to the foregoing embodiments, a person of ordinary skill in the art is to understand that they may still make modifications to the technical solutions described in the foregoing embodiments or make equivalent replacements to some technical features thereof, without departing from the spirit and scope of the technical solutions of the embodiments of this application.

What is claimed is:

1. A method for training a gaze tracking model, comprising:
   obtaining a training sample set, the training sample set comprising multiple training sample pairs, each training sample pair comprising an eye sample image and a labeled gaze vector corresponding to the eye sample image;
   processing the eye sample images in the training sample set by using an initial gaze tracking model to obtain a predicted gaze vector of each eye sample image;
   determining a model loss according to a cosine distance between the predicted gaze vector and the labeled gaze vector for each eye sample image;
   iteratively adjusting one or more reference parameters of the initial gaze tracking model until the model loss meets a convergence condition, to obtain a target gaze tracking model;
   processing a target eye image by using the target gaze tracking model to determine a predicted gaze vector of the target eye image;
   determining, when the target eye image belongs to a video frame in a video stream, a first and a second reference eye images corresponding to the target eye image, the first and the second reference eye images and the target eye image being images in consecutive video frames in the video stream; and
   performing smoothing on the predicted gaze vector corresponding to the target eye image according to a predicted gaze vector corresponding to the first and the second reference eye images using a second-order Bezier curve.

2. The method according to claim 1, wherein each training sample pair further comprises labeled coordinates of an eyeball in the eye sample image; and the processing the eye sample images in the training sample set by using an initial gaze tracking model to obtain a predicted gaze vector of each eye sample image comprises:
   processing the eye sample image by using the initial gaze tracking model, to obtain the predicted gaze vector of the eye sample image and predicted coordinates of the eyeball; and
   the method further comprises:
   determining the model loss according to a Euclidean distance between the predicted coordinates of the eyeball and the labeled coordinates of the eyeball.

3. The method according to claim 1, wherein the labeled gaze vector is a unit circle-based direction vector, and the method further comprises:
   normalizing the predicted gaze vector to obtain a normalized gaze vector; and
   the determining a model loss according to a cosine distance between the predicted gaze vector and the labeled gaze vector for each eye sample image comprises:
   determining the model loss according to a cosine distance between the normalized gaze vector and the labeled gaze vector.

4. The method according to claim 1, wherein the processing the eye sample images in the training sample set by using an initial gaze tracking model to obtain a predicted gaze vector of each eye sample image comprises:
   performing at least one type of processing on the eye sample image, the at least one type of processing comprising: affine transformation, white balance, auto contrast, or Gaussian blur;
   flipping a first eye sample image in the training sample set into a second eye sample image, and correspondingly flipping a labeled gaze vector corresponding to the first eye sample image, the second eye sample image being an image of an eye in a target direction, the initial gaze tracking model being configured to process the image of the eye in the target direction, the second eye sample image being a left eye sample image when the first eye sample image is a right eye sample image, and the second eye sample image being a right eye sample image when the first eye sample image is a left eye sample image;
   performing wrapping on each eye sample image, to obtain a standard image; and
   mapping the standard image by using inverted residual blocks in the initial gaze tracking model to obtain a predicted gaze vector of the standard image.

5. The method according to claim 4, wherein the method further comprises:
   flipping, when the standard image is obtained from the first eye sample image, the predicted gaze vector of the standard image back to a space corresponding to the first eye sample image.

6. The method according to claim 4, wherein the eye in the target direction is a left eye, and the method further comprises:
   obtaining a first horizontal coordinate value in a predicted gaze vector of the left eye and a second horizontal coordinate value in a predicted gaze vector of a right eye, the left eye and the right eye belonging to the same user object; and
   correcting the first horizontal coordinate value and the second horizontal coordinate value when the first horizontal coordinate value represents that the left eye looks to the left and the second horizontal coordinate value represents that the right eye looks to the right.

7. The method according to claim 6, wherein the correcting the first horizontal coordinate value and the second horizontal coordinate value comprises:
    determining an average value of a horizontal coordinate of the left eye and a horizontal coordinate of the right eye according to the first horizontal coordinate value and the second horizontal coordinate value;
    adjusting the predicted gaze vector of the right eye and the predicted gaze vector of the left eye to be parallel to each other, the horizontal coordinate of the right eye after the adjustment being a third horizontal coordinate value; and
    determining a fourth horizontal coordinate value of the horizontal coordinate of the right eye according to the average value and the third horizontal coordinate value.

8. The method according to claim 4, wherein a number of the inverted residual blocks is less than 19.

9. The method according to claim 1, wherein the method further comprises:
    obtaining the target eye image before processing the target eye image; and
    performing gaze tracking according to the predicted gaze vector.

10. The method according to claim 9, wherein the method further comprises:
    determining coordinates of an eyeball in the target eye image; and
    performing, by using the coordinates of the eyeball as a gaze starting point, gaze tracking according to a direction indicated by the predicted gaze vector.

11. The method according to claim 9, wherein
    performing smoothing on the predicted gaze vector corresponding to the target eye image according to a predicted gaze vector corresponding to the first and the second reference eye images includes:
    obtaining the predicted gaze vector corresponding to the first, the second, and a third reference eye images using a third-order Bezier curve,
    wherein the first, the second, and the third reference eye images and the target eye image are images in consecutive video frames in the video stream.

12. A computer device, comprising a processor and a memory, the memory being configured to store a plurality of program codes that, when executed by the processor, cause the computer device to perform a plurality of operations including: obtaining a training sample set, the training sample set comprising multiple training sample pairs, each training sample pair comprising an eye sample image and a labeled gaze vector corresponding to the eye sample image; processing the eye sample images in the training sample set by using an initial gaze tracking model to obtain a predicted gaze vector of each eye sample image; determining a model loss according to a cosine distance between the predicted gaze vector and the labeled gaze vector for each eye sample image; iteratively adjusting one or more reference parameters of the initial gaze tracking model until the model loss meets a convergence condition, to obtain a target gaze tracking model; processing a target eye image by using the target gaze tracking model to determine a predicted gaze vector of the target eye image; determining, when the target eye image belongs to a video frame in a video stream, a first and a second reference eye images corresponding to the target eye image, the first and the second reference eye images and the target eye image being images in consecutive video frames in the video stream; and performing smoothing on the predicted gaze vector corresponding to the target eye image according to a predicted gaze vector corresponding to the first and the second reference eye images using a second-order Bezier curve.

13. The computer device according to claim 12, wherein each training sample pair further comprises labeled coordinates of an eyeball in the eye sample image; and the processing the eye sample images in the training sample set by using an initial gaze tracking model to obtain a predicted gaze vector of each eye sample image comprises:
    processing the eye sample image by using the initial gaze tracking model, to obtain the predicted gaze vector of the eye sample image and predicted coordinates of the eyeball; and
    the plurality of operations further comprises:
    determining the model loss according to a Euclidean distance between the predicted coordinates of the eyeball and the labeled coordinates of the eyeball.

14. The computer device according to claim 12, wherein the labeled gaze vector is a unit circle-based direction vector, and the plurality of operations further comprises:
    normalizing the predicted gaze vector to obtain a normalized gaze vector; and
    the determining a model loss according to a cosine distance between the predicted gaze vector and the labeled gaze vector for each eye sample image comprises:
    determining the model loss according to a cosine distance between the normalized gaze vector and the labeled gaze vector.

15. The computer device according to claim 12, wherein the processing the eye sample images in the training sample set by using an initial gaze tracking model to obtain a predicted gaze vector of each eye sample image comprises:
    performing at least one type of processing on the eye sample image, the at least one type of processing comprising: affine transformation, white balance, auto contrast, or Gaussian blur;
    flipping a first eye sample image in the training sample set into a second eye sample image, and correspondingly flipping a labeled gaze vector corresponding to the first eye sample image, the second eye sample image being an image of an eye in a target direction, the initial gaze tracking model being configured to process the image of the eye in the target direction, the second eye sample image being a left eye sample image when the first eye sample image is a right eye sample image, and the second eye sample image being a right eye sample image when the first eye sample image is a left eye sample image;
    performing wrapping on each eye sample image, to obtain a standard image; and
    mapping the standard image by using inverted residual blocks in the initial gaze tracking model to obtain a predicted gaze vector of the standard image.

16. The computer device according to claim 12, wherein the plurality of operations further comprises:
    obtaining the target eye image before processing the target eye image;
    performing gaze tracking according to the predicted gaze vector.

17. A non-transitory computer-readable storage medium, storing a plurality of program codes that, when executed by a processor of a computer device, cause the computer device to perform a plurality of operations including: obtaining a training sample set, the training sample set comprising multiple training sample pairs, each training sample pair comprising an eye sample image and a labeled gaze vector corresponding to the eye sample image; processing the eye sample images in the training sample set by using an initial gaze tracking model to obtain a predicted gaze vector of each eye sample image; determining a model loss according to a cosine distance between the predicted gaze vector and the labeled gaze vector for each eye sample image; and iteratively adjusting one or more reference parameters of the initial gaze tracking model until the model loss meets a convergence condition, to obtain a target gaze tracking models processing a target eye image by using the target gaze tracking model to determine a predicted gaze vector of the target eye image; determining, when the target eye image belongs to a video frame in a video stream, a first and a second reference eye images corresponding to the target eye image, the first and the second reference eye images and the target eye image being images in consecutive video frames in the video stream; and performing smoothing on the predicted gaze vector corresponding to the target eye image according to a predicted gaze vector corresponding to the first and the second reference eye images using a second-order Bezier curve.

18. The non-transitory computer-readable storage medium according to claim 17, wherein each training sample pair further comprises labeled coordinates of an eyeball in the eye sample image; and the processing the eye sample images in the training sample set by using an initial gaze tracking model to obtain a predicted gaze vector of each eye sample image comprises:

processing the eye sample image by using the initial gaze tracking model, to obtain the predicted gaze vector of the eye sample image and predicted coordinates of the eyeball; and the plurality of operations further comprises:

determining the model loss according to a Euclidean distance between the predicted coordinates of the eyeball and the labeled coordinates of the eyeball.

19. The non-transitory computer-readable storage medium according to claim 17, wherein the labeled gaze vector is a unit circle-based direction vector, and the plurality of operations further comprises:

normalizing the predicted gaze vector to obtain a normalized gaze vector; and the determining a model loss according to a cosine distance between the predicted gaze vector and the labeled gaze vector for each eye sample image comprises:

determining the model loss according to a cosine distance between the normalized gaze vector and the labeled gaze vector.

20. The non-transitory computer-readable storage medium according to claim 17, wherein the plurality of operations further comprises:

obtaining the target eye image before processing the target eye image;

processing the target eye image by using the target gaze tracking model to determine a predicted gaze vector of the target eye image; and performing gaze tracking according to the predicted gaze vector.

* * * * *